Jan. 14, 1969          J. H. SPURK          3,421,781

TRANSITION SECTION HAVING A CONSTANT CROSS SECTIONAL AREA

Original Filed Aug. 21, 1964

INVENTOR,
Joseph H. Spurk

BY: Harry M. Saragovitz,
Edward J. Kelly &
Herbert Berl

ATTORNEYS

Jan. 14, 1969     J. H. SPURK     3,421,781
TRANSITION SECTION HAVING A CONSTANT CROSS SECTIONAL AREA
Original Filed Aug. 21, 1964     Sheet 2 of 2

INVENTOR,
Joseph H. Spurk
BY: Harry M. Saragovitz,
Edward J. Kelly &
Herbert Berl     ATTORNEYS.

United States Patent Office 3,421,781
Patented Jan. 14, 1969

1

3,421,781
TRANSITION SECTION HAVING A CONSTANT
CROSS SECTIONAL AREA
Joseph H. Spurk, Darlington, Md., assignor to the United
States of America as represented by the Secretary of
the Army
Original application Aug. 21, 1964, Ser. No. 391,344, now
Patent No. 3,324,534, dated June 13, 1967. Divided and
this application Jan. 30, 1967, Ser. No. 633,311
U.S. Cl. 285—176                                    9 Claims
Int. Cl. F16l 25/00; F16l 55/00

ABSTRACT OF THE DISCLOSURE

A transition section of constant cross sectional area between tubular members of different sectional shape but of identical cross sectional area.

---

The invention described herein, if patented, may be manufactured and used by or for the Government, for governmental purposes without the payment to me of any royalty thereon.

This application is a division of copending application, Ser. No. 391,344, filed Aug. 21, 1964, now Patent No. 3,324,534.

The invention relates to transition sections of tubing which are used to connect tubing of one cross section to tubing having a different cross section. More specifically the invention relates to such a section which connects tubing having a given cross sectional area to tubing of a different shape but of the same cross sectional area without changing the cross sectional area in the transition section.

In many gasdynamical or hydrodynamical applications it is necessary to connect a pipe or tube of a round cross section in end-to-end relation with a pipe or tube of a square or other symmetrical noncircular interior cross section having the same cross sectional area as the round pipe or tube. The transition between the two cross sectional shapes poses a mechanical problem insofar as the fabrication transition pipe or section is concerned. Often, in order to expedite the fabrication of this section, no care is taken normally to keep the cross sectional area constant throughout the length of the section. In such an instance, as the cross sectional area changes more or less abruptly and in an uncontrolled manner, serious pressure losses and boundary layer separation occur or its transforms the laminar boundary layer into a turbulent boundary layer. In supersonic flow it gives rise to compression waves and shocks which, by resultant reflection on the walls of the pipe, spread downstream of the transition section and affects the entire flow.

In instances where the tube or pipe of square cross section serves as a test chamber (as in the case for shock tubes, expansion tubes or the like) the entire operation of the facility may be adversely affected.

With the foregoing in view, it is an object of the invention to provide an improved transition section of the class described.

A further object is to provide such an improved transition section which is so formed as to maintain the cross sectional area of the pipes or tubes connected throughout the length of the section.

A further object is to provide such an improved transition section which maintains the cross sectional area of the connected pipes throughout its length by simple geometrical shapes which may be readily formed.

A further object is to provide a transition section such as that last described which is formed by modifying the adjacent ends of the pipes or tubes to be connected and then so connecting the modified ends together as to provide not only a uniform change of shape from one to the other but one which accurately maintains the cross sectional area throughout the length of the transition section thus created.

Other objects and advantages reside in the particular structure of the several elements of the invention, combinations and subcombinations of such elements, and/or in the particular method of forming the section, all of which will be readily apparent to those skilled in the art upon reference to the attached drawing and to the following specification wherein the invention is shown, described and claimed.

Figure 1:
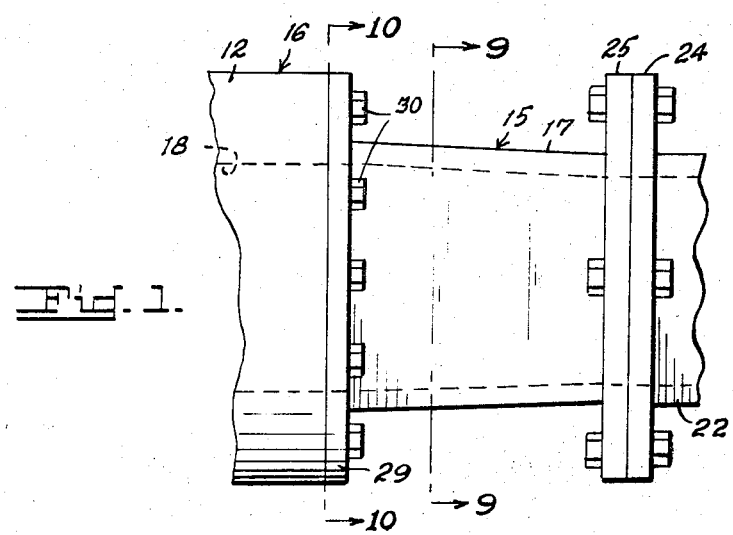
FIGURE 1 is an elevational view of a completed transition section according to the invention showing the same coupling together two pipes of different cross section but having the same cross sectional area.
Figure 3:
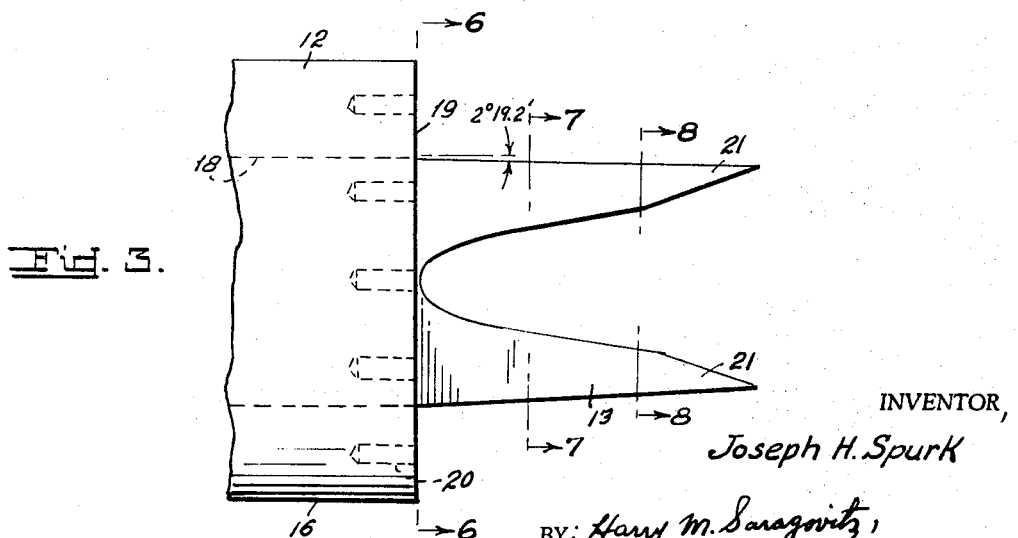
FIGURE 3 is an elevational view of the plug element of the section.
Figure 4:
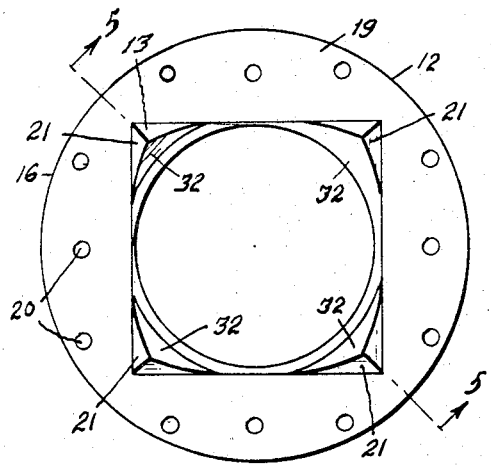
FIGURE 4 is an end view of FIGURE 3 looking from the right.
Figure 5:
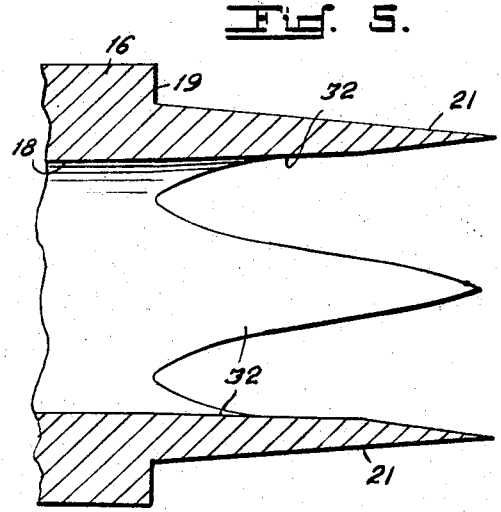
FIGURE 5 is a diagonal longitudinal sectional view taken substantially on the plane of the line 5—5 of FIGURE 4.
Figure 6:
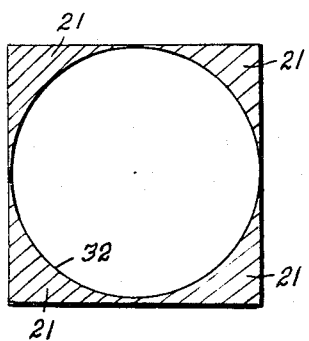
Figure 7:
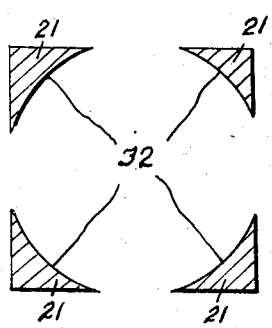
Figure 8:
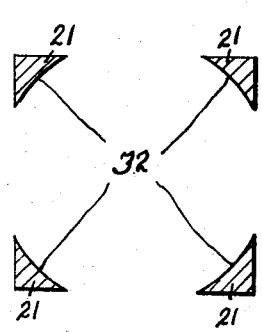
Figure 10:
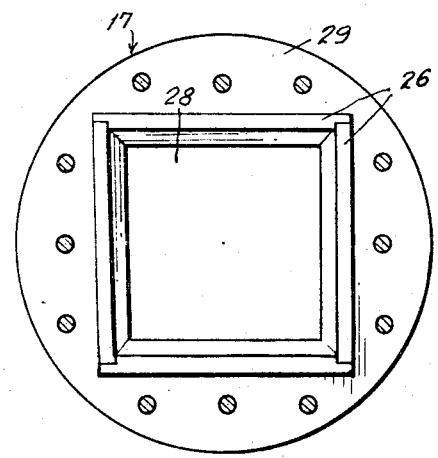
Figure 9:
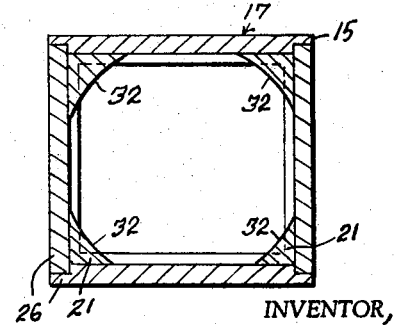

FIGURES 6, 7 and 8 are transverse sectional views taken respectively on the planes of the lines 6—6, 7—7, and 8—8 of FIGURE 3;

FIGURE 9 is a transverse sectional view taken on the plane of the line 9—9 of FIGURE 1; and FIGURE 10 is a transverse sectional view taken on the plane of the line 10—10 of FIGURE 1.

Figure 2:
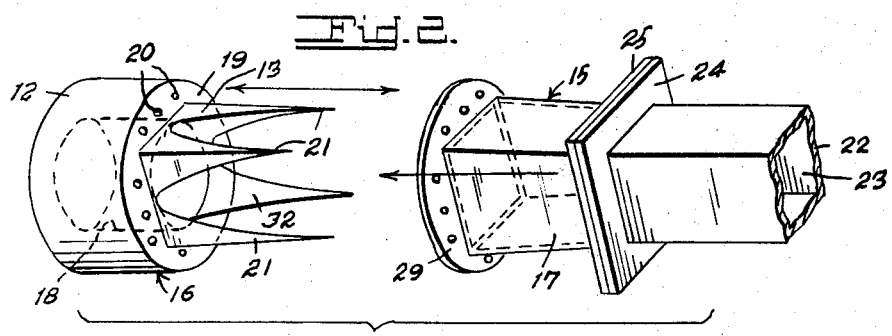
FIGURE 2 is an exploded perspective view of the two elements of the transitional section connected to their pipes but separate from each other.

Referring specifically to the drawing, wherein like reference characters designate like parts in all views, and looking first to FIGURES 1 and 2, 15 designates generally a transition section according to the invention. The plug element of the invention is generally designated by 16 and the socket element by 17. The plug element 16 comprises a pipe 12 having a circular cross section including a bore 18 of like-shaped cross section and a known cross sectional area. One end of the pipe 12 is faced off to provide a truncated pyramid 13 of square cross section in the embodiment illustrated. An alternative procedure is to counterbore that portion of circular 18 of pipe 12 and then face off one end of pipe 12 to reduce pyramid 13 to four projections. As will appear later, other cross sectional shapes are contemplated. Such facing off of the pipe end provides a shoulder 19 for a purpose to be apparent hereinafter. The pipe 12 has a series of tapped holes 20 bored therein through the shoulder 19 to provide means for securing the socket section 17 thereto as will appear later.

That portion of the circular bore 18 of the pipe 12 which is within the truncated pyramid 13 is now counterbored by an appropriate tool having a cutting edge formed as a plane curve which enlarges the bore 18 to reduce the pyramid 13 to four projections 21 each of which has two exterior plane surfaces which intersect at an angle and an arcuate interior surface of revolution 32. Each projection tapers to a point at its free end which point is substantially in the plane of the frustum of the pyramid 13.

The socket element 17 of the transition section 15 in the embodiment illustrated, comprises a pipe 22 having a symmetrical, noncircular interior bore 23 which is of the same cross sectional area as that of bore 18 of the plug element. In this instance the bore 23 is square. A square flange 24 is formed on one end of pipe 22 for securing the same to a like flange 25 of the socket element 17. Such element may comprise four flat plates as 26 which are secured together and to the flange 25 in any suitable manner as by welds, not shown, so as to form a truncated pyramidal recess 28 which is complementary to the truncated pyramid 13 of the plug element 16 in shape, diameter and length whereby the latter is nested therein to complete the transition section 15, the interior diameter of the same varies constantly in shape from end to end but retains the same cross sectional area throughout its length, which area is the same as the like areas of the pipes 13 and 22. The socket element 17 may be secured to the pipe 13 in any suitable manner as by the provision of a circular flange 29 which corresponds in shape to the shoulder 19 whereby it may be secured thereto by machine screws 30 or by welding. After the elements 16 and 17 are nested together, they may be secured together in any suitable manner, not shown, as by welding, machine screws or the like.

The resultant transition section 15 permits the passage of fluids from pipe 12 to pipe 22 or vice versa smoothly without pressure changes or the resultant damage to the pipes. This is accomplished by the particular shape of the generating curve of the surface of revolution 32 of the bore of the pyramid 13 which when the transition is between a pipe of circular cross section and one of square cross section is according to the following formula:

$$r^* = f(ra l/L)$$

in which $r^*$ is the generating curve
$f$ is a mathematical symbol for a function
$r$ is the radius of the interior diameter of cylindrical pipe 12
$a$ is one half the base length of pyramid 13
$l$ is the distance from the point where the round cross section changes into the square cross section
$L$ is the overall height of pyramid 13

From the foregoing it is seen that $r^*$ is a function of $ral/L$.

If a linear dependence of "$a$" from "$l$" is chosen as $$a = r - (r - a_{top}) l/L$$

then from geometric consideration follow two equations:

$$\cos \alpha/2 = a/r^*$$

$$\left(\frac{r}{r^*}\right)^2 = 1 - 2\left(\frac{\alpha°}{180°} - \frac{\sin \alpha}{\pi}\right)$$

wherein $\alpha$ is a parameter. These equations must be solved for $r/r^*$ as a function of $l/L$. This is done numerically and the result is given in Table 1.

TABLE 1

| l/L | r*/r | a/r |
|---|---|---|
| 0.0 | 1.0000 | 1.0000 |
| 0.1 | 1.0018 | |
| 0.2 | 1.0058 | |
| 0.3 | 1.0117 | |
| 0.4 | 1.0199 | |
| 0.5 | 1.0308 | |
| 0.6 | 1.0449 | |
| 0.7 | 1.0638 | |
| 0.8 | 1.0900 | |
| 0.9 | 1.1299 | |
| 1.0 | 1.2533 | 0.8862 |

To obtain dimensional values of $r^*$ versus $l$ follow the procedure below:

(a) Choose value of cross sectional area A (in this case 1 (foot)$^2$).

(b) Choose value for length of transition piece L (here taken to be 1 foot).

(c) it is $$r^2 \pi = A \text{ circular section}$$

$$4 a_{top}^2 = A \text{ square section}$$

$r$ is then $$r = \sqrt{\frac{A}{\pi}} = 0.56419 \text{ [ft.]}$$

In the example $$a_{top} = 0.5 \sqrt{A} = 0.5 \text{ [ft.]}$$

($a$ is half the base length of inner cross section of the truncated pyramid, at "top" of pyramid; this cross section is equal to that of the square pipe.)

(d) Take Table 1, which gives $r^*/r$ as a function of $l/L$ and multiply first column by L (from step (b) above) to obtain a dimensional $l$. Multiply the second column ($r^*/r$) by $r$ (from step (c)) to obtain a dimensional $r^*$. Multiply the third column $a/r$ by $r$ to get the dimensional $a$ at top and base of pyramid. Table 1$a$ shows the result for my example.

TABLE 1a

| l/L | r*/r | a/r | l [ft.] | r* [ft.] | a [ft.] |
|---|---|---|---|---|---|
| 0.0 | 1.00000 | 1.0000 | 0.0 | 0.56419 | 0.56419 |
| 0.1 | 1.0018 | | 0.1 | 0.5621 | |
| 0.2 | 1.0058 | | 0.2 | 0.56746 | |
| 0.3 | 1.0117 | | 0.3 | 0.57079 | |
| 0.4 | 1.0199 | | 0.4 | 0.57542 | |
| 0.5 | 1.0308 | | 0.5 | 0.58197 | |
| 0.6 | 1.0449 | | 0.6 | 0.58952 | |
| 0.7 | 1.0638 | | 0.7 | 0.60019 | |
| 0.8 | 1.0900 | | 0.8 | 0.61497 | |
| 0.9 | 1.1299 | | 0.9 | 0.63748 | |
| 1.0 | 1.2533 | 0.8862 | 1.0 | 0.70710 | 0.5000 |

Broad-general formulas applicable to symmetric, non-circular cross section pipes (i.e., those with regular polygonal cross sections), are worked out as follows.

The general formula for the linear dependence between $a$ and $l$ is chosen to be $$a = r - \left(\frac{l}{L}\right)(r - a_{top})$$

where $a$ is the perpendicular distance from the center of the cross section to the side of the polygon in accordance with the definition for the case of the square pipe.

From geometrical considerations follow two equations:

$$\cos\left(\frac{\alpha}{2}\right) = \left(\frac{a}{r^*}\right)$$

$$\left(\frac{r}{r^*}\right)^2 = 1 - \left(\frac{n}{2}\right)\left[\left(\frac{\alpha°}{180°}\right) - \left(\frac{\sin \alpha}{\pi}\right)\right]$$

where $n$ is the number of corners and $\alpha$ is a parameter. They must be solved simultaneously for ($r/r^*$) as a function of ($l/L$) for different polygons having $n$ corners.

The area of the circular cross section, A, is $A = \pi r^2$. The area of the polygon cross section, also equal to A, is $$A = a_{top}^2 n \tan\left(\frac{180°}{n}\right)$$

Therefore $$a_{top} = \left(\frac{r}{2}\right)\left\{\frac{\pi}{n \tan\left(\frac{180°}{n}\right)}\right\}^{1/2}$$

TABLE 1b

| (l/L) | n=3 | n=4 | n=5 | n=6 |
|---|---|---|---|---|
| 0.0 | 1.0000 | 1.0000 | 1.0000 | 1.0000 |
| 0.1 | 1.0038 | 1.0018 | 1.0011 | 1.0008 |
| 0.2 | 1.0118 | 1.0058 | 1.0035 | 1.0023 |
| 0.3 | 1.0246 | 1.0117 | 1.0072 | 1.0048 |
| 0.4 | 1.0421 | 1.0199 | 1.0119 | 1.0080 |
| 0.5 | 1.0647 | 1.0308 | 1.0187 | 1.0123 |
| 0.6 | 1.0952 | 1.0449 | 1.0270 | 1.0180 |
| 0.7 | 1.1360 | 1.0638 | 1.0381 | 1.0255 |
| 0.8 | 1.1922 | 1.0900 | 1.0538 | 1.0359 |
| 0.9 | 1.2815 | 1.1299 | 1.0779 | 1.0517 |
| 1.0 | 1.5551 | 1.2533 | 1.1495 | 1.0996 |

I claim:
1. A transition section for connecting together a circular tube and a symmetrical noncircular tube, said tubes having the same cross sectional area, said section having opposite ends corresponding in shape and area to said tubes, and said section having means defining a constantly varying internal cross sectional shape of substantially constant cross section from end to end which is the same as the cross sectional area of each of said tubes.

2. A transition section according to claim 1, wherein said means defining said varying internal shape of said section is provided by merging tapered arcuate inner surfaces comprising a surface of revolution coaxially with the inner planar surfaces of a complementary symmetrical noncircular truncated pyramidal hollow body.

3. A transition section according to claim 2 wherein said surface of revolution has a generating curve according to the formula $r^* = f(ra/L)$ and wherein:

$r^*$ is the generating curve;
$f$ is a mathematical symbol for a function;
$r$ is the radius of the circular tube;
$a$ is one half the base length of the pyramidal recess;
$l$ is the distance from the point where the round cross section changes into the square cross section;
$L$ is the height of the pyramidal recess.

4. A transition section according to claim 2 wherein said surface of revolution has a generating curve according to the formula $$\left(\frac{r^2}{r^{*2}}\right) = 1 - \frac{n}{2}\left[\left(\frac{\alpha}{180°}\right) - \left(\frac{\sin \alpha}{\pi}\right)\right]$$

and wherein said truncated symmetrical pyramidal recess has a distance to the axis from its planar surfaces given by a said distance varying from $$a_{top} = \left(\frac{r}{2}\right)\left[\frac{\pi}{n \tan\left(\frac{180°}{n}\right)}\right]^{1/2}$$

at the top of the pyramidal recess to $r$ in a linear fastion according to the formula $$a = r - \left(\frac{c}{L}\right)(r - a_{top})$$

5. A transition section for connecting together a circular tube and a square tube of like cross sectional area, said section having one circular end and one square end, said ends corresponding in size and shape to said tubes and said section having means defining an internal cross sectional shape which varies constantly from end to end and provides a substantially uniform cross sectional area throughout its length which corresponds to the area of each of said tubes.

6. A transition section according to claim 5, wherein said means includes two hollow bodies secured together in nested coaxial relation, one said body including said circular end and four equi-spaced tapered projections extending therefrom in concentric relation to the axis thereof, said projections each having arcuate inner surfaces and two right angularly intersecting planar outer surfaces defining the corners of a truncated square pyramid, the other said body including said square end and comprising four planar inner surfaces which intersect to provide a square truncated pyramidal recess complementary to said pyramid, said arcuate inner surfaces of said pyramid merging with said planar inner surfaces of said recess to provide a composite inner surface for said transition section, and said composite inner surface having a tapering and constantly varying internal shape providing a uniform cross sectional area throughout its length which is the same as said cross sectional area of each of said tubes.

7. A transition section for connecting together a circular tube and a symmetrical noncircular tube, said tubes having the same cross sectional areas, said section having a circular end and a symmetrical noncircular end, said ends corresponding in shape and cross sectional area to said tubes, comprising a first hollow body including said circular end and a plurality of tapered projections extending therefrom concentrically of the axis thereof, said projections having arcuate inner surfaces and two angularly disposed planar outer surfaces, said outer surfaces defining the corners of a truncated symmetrical noncircular pyramid, there being a second hollow body including said noncircular end and having an interior formed by a plurality of intersecting planar surfaces defining a truncated symmetrical noncircular pyramidal recess complementary to said pyramid, said bodies being secured together in nested coaxial relationship, and said arcuate inner surfaces of said pyramid merging with said planar inner surfaces of said recess to provide a composite inner surface for said section, and said composite inner surface having a constant cross sectional area throughout its length which is the same as said cross sectional area of each of said tubes.

8. A transition section for connecting together circular and square tubes of like cross sectional area, said section comprising a hollow square truncated pyramidal body having planar inner surfaces and a truncated end corresponding in size to said square tube, there being a second hollow body having a circular end corresponding in size to said circular tube, said second body having four equi-spaced pointed projections extending therefrom away from said circular end in concentric relation to the axis thereof, said projections each having two planar outside surfaces at right angles to each other and defining the corners of a truncated pyramid which is complementary to said first body and fixedly nested therein coaxially thereof, said projections each having a tapered concave inner surface, said inner surfaces of said projections merging with said planar surfaces of said first body to form a tapered and constantly varying inner surface for said transition section, and said inner surface of such section having a constant cross sectional area throughout its length which is the same as said cross sectional area of each of said tubes.

9. A transition section for connecting together circular and square tubes of equal cross sectional area, said section comprising a hollow square truncated pyramidal body having planar inner surfaces and a truncated end of the same size as said square tube, said section also including a second hollow circular body having one circular end of the same size as said circular tube, said second body having four equi-spaced projections extending therefrom away from said circular end in concentric relation to the axis thereof, said projections each having two right angled outer surfaces defining the corners of a truncated pyramid complementary to said first named body and being fixedly nested therein coaxially thereof, said projections having concave tapered inner surfaces comprising segments of a surface of revolution, and said inner surfaces of said projections merging with said planar surfaces of said first body to form a constantly varying inner surface for said transition section whereby the latter has a constant cross sectional area throughout its length which is the same as the like area of each of said tubes.

References Cited

UNITED STATES PATENTS

| 1,860,521 | 5/1932 | Anderson. |
| 2,397,655 | 4/1946 | Francis. |
| 2,476,621 | 7/1949 | Okress. |

FOREIGN PATENTS 720,206  12/1954  Great Britain.

CARL W. TOMLIN, Primary Examiner.

D. W. AROLA, Assistant Examiner.

U.S. Cl. X.R.

29—157; 138—39; 285—405